UNITED STATES PATENT OFFICE.

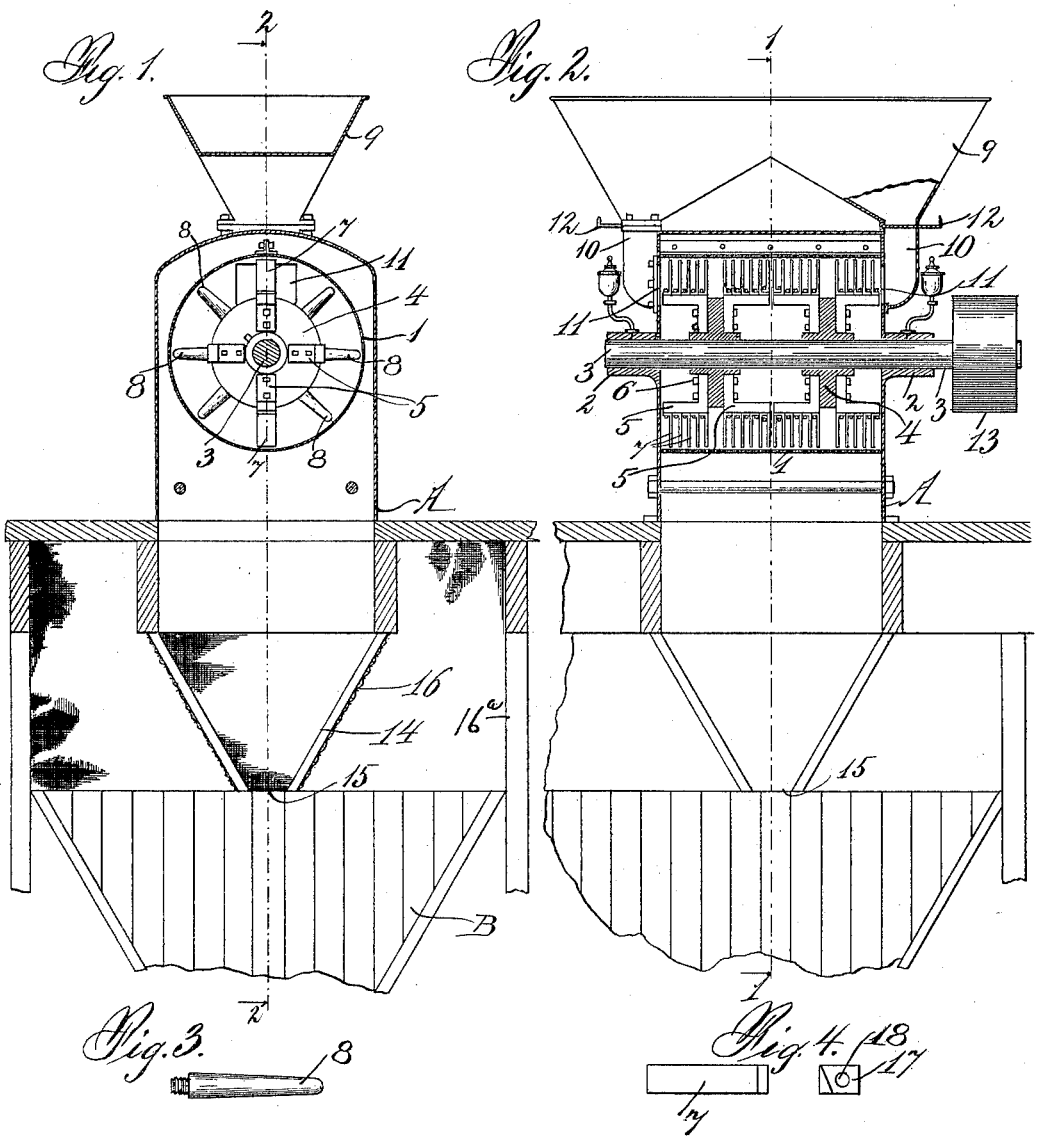

FRANK ANDREÉ, OF CHICAGO, ILLINOIS.

CENTRIFUGAL PULVERIZER.

SPECIFICATION forming part of Letters Patent No. 600,473, dated March 8, 1898.

Application filed January 19, 1897. Serial No. 619,787. (No model.)

*To all whom it may concern:*

Be it known that I, FRANK ANDREÉ, a citizen of the United States, residing at Chicago, in the county of Cook and State of Illinois, have invented certain new and useful Improvements in Centrifugal Pulverizers; and I do hereby declare the following to be a full, clear, and exact description of the invention, such as will enable others skilled in the art to which it appertains to make and use the same.

My invention relates to a novel construction in a centrifugal pulverizer, the object being to provide a machine of this character which is adapted to pulverize or cut into very fine particles any kind of material and at the same time so ventilate the pulverizing-chamber as to prevent the material acted upon from becoming heated; and it consists in the features of construction and combinations of parts hereinafter fully described and claimed.

In the accompanying drawings, illustrating my invention, Figure 1 is a vertical transverse section of a device constructed in accordance with my invention, taken on the line 1 1 of Fig. 2. Fig. 2 is a vertical longitudinal section taken on the line 2 2 of Fig. 1. Fig. 3 is a detail view in elevation of one of the beater-fingers I employ. Fig. 4 comprises two detail views of one of the cutters I employ.

Referring now to said drawings, A indicates the casing of a pulverizer constructed in accordance with my invention, which is suitably mounted in a scaffold above a hopper B, adapted to receive the pulverized material. Mounted within the upper end portion of said casing A is a perforated sheet-metal cylinder 1, extending from side to side of said casing A. Said cylinder 1 is of smaller diameter than the short diameter of said casing A, so as to leave a space around said cylinder through which the pulverized material is adapted to pass from all of said perforations in said cylinder. Mounted in bearings 2 on said casing and running centrally through said cylinder 1 is a shaft 3, carrying a plurality of disks 4, rigidly mounted thereon, to which a series of brackets 5, of an L shape, are secured. Said brackets 5 are secured to said disks 4 by means of bolts 6 passing through one arm of each of said brackets and into said disk 4. Said brackets extend radially outwardly from the hubs of said disks 4 and project slightly beyond the periphery thereof. The other arms of said brackets 5 extend at right angles on each side of said disks 4 and carry a plurality of knives or beaters 7 and 8, extending radially outwardly therefrom at regular intervals. I employ either knives 7 or beaters 8, or alternate the same according to the material I desire to pulverize. Mounted upon said casing A is a hopper 9, the bottom of which is inclined upwardly between its ends, so as to feed the material contained therein equally to each of the spouts 10, which establish communication between the same and said cylinder 1. Said spouts 10 are connected with said cylinder 1 by means of openings 11 in said casing A interiorly of said cylinder. Slide-valves 12 are interposed in said passages 10 to regulate the amount of material fed to said cylinder. Said shaft 3 carries a pulley 13, which is geared to any suitable source of power and revolves at a very high speed. The rapid revolution of said brackets and knives or beaters obviously throws the air out of said cylinder by centrifugal force, and thus creates a partial vacuum within said cylinder. This causes a suction in said passages 10, through which the air rushes to fill said vacuum. The quantity of air thus introduced is very large and has the effect not only of keeping said cylinder and the material contained therein very cool, but also serves to aid in drawing the material into said cylinder and throwing the pulverized portion thereof out of the same through said perforations. The only outlet for the current of air thus created lies in the spout 14, and as the opening 15 at the lower end thereof is very small and insufficient to permit the ready passage of the quantity of air introduced into said cylinder I have constructed said spout of a skeleton frame, around which cheese-cloth is fastened. The cheese-cloth has the effect of permitting the passage of air therethrough, but so divides the current that the same does not blow through the same with sufficient force to carry the pulverized material with it, the latter being thus enabled to fall of its own weight, aided by the downward passage of the air through the opening 15 into said hopper B. To further prevent any of said pulverized material being lost, I secure cheese-cloth around the uprights 16ᵃ, supporting said scaffold upon which my device is mounted, so as to completely surround the space above the upper end of the hopper and below the scaffold with such cheese-cloth. Thus sufficient resistance is offered to the passage of the air to equally distribute the current over the entire surface of the cheese-cloth and thus reduce its force to an extent sufficient to prevent any of the pulverized material from being carried through said cheese-cloth with said air, while at the same time I afford sufficient opening for the passage of the air to enable me to employ a large quantity of the same. Said beaters 8 consist of blunt round fingers having screw-threaded shanks which are adapted to engage the screw-threaded openings in the outer arms of said brackets 5 and in the peripheries of said disks 4. Said knives 7 are provided at their inner ends with flanges 17, provided with openings 18, through which a screw is adapted to pass into said screw-threaded openings in said outer arms of said brackets. There are preferably four sets of said brackets 5, though the number may obviously be increased or diminished without departing from the spirit of my invention. Said beaters 8 are employed when it is desired to pulverize any hard material—such as sugar, borax, and the like—while said knives are employed when it is desired to produce a very fine cut material—such, for instance, as feathers, tobacco, and the like—and both beaters and knives alternated are employed to pulverize still other materials.

It will be obvious that when it is desired to pulverize either sugar or borax or any other like material which becomes soft through heating thorough ventilation is absolutely necessary in order to prevent said materials from sticking to the cylinder and heaters and thus soon filling the perforations in said cylinder.

My device operates very advantageously with small power and is in every way economical, as its simplicity prevents its getting out of order and the materials used in its construction are of the most durable kind.

I claim as my invention—

In a centrifugal pulverizer, a casing open at its lower end, a perforated cylinder mounted within the same and abutting at its ends against two opposite walls thereof, so as to leave a free space around said cylinder, a shaft passing centrally through said cylinder and running in bearings in the walls of said casing, a plurality of disks carried by said shaft within said cylinder, a plurality of removable L-shaped arms radially secured to said disks on both sides thereof, screw-threaded openings in the horizontal portions of said arms, pulverizing devices secured in said openings, openings in the walls of said casing adjacent the central portion of said cylinder adapted to establish communication between the same and the spouts of a hopper mounted upon the upper end of said casing, a hopper below said casing, and means for collecting the pulverized material in said hopper and permitting the escape of air, substantially as described.

In testimony whereof I affix my signature in presence of two witnesses.

FRANK ANDREÉ.

Witnesses:
RUDOLPH WM. LOTZ,
ERWIN J. LOTZ.